US012752252B2

(12) United States Patent
Hepburn et al.

(10) Patent No.: US 12,752,252 B2
(45) Date of Patent: Oct. 6, 2026

(54) ABSORPTION METHOD AND MESOPOROUS ALUMINA USED FOR THE SAME

(71) Applicant: FUJIMI INCORPORATED, Kiyosu (JP)

(72) Inventors: Robert Hepburn, Tualatin, OR (US); Shogo Tsubota, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 410 days.

(21) Appl. No.: 18/019,663

(22) PCT Filed: Aug. 5, 2021

(86) PCT No.: PCT/JP2021/029172
§ 371 (c)(1),
(2) Date: Feb. 3, 2023

(87) PCT Pub. No.: WO2022/030593
PCT Pub. Date: Feb. 10, 2022

(65) Prior Publication Data

US 2023/0321628 A1 Oct. 12, 2023

Related U.S. Application Data

(60) Provisional application No. 63/061,956, filed on Aug. 6, 2020.

(51) Int. Cl.
*B01J 20/28* (2006.01)
*B01D 15/00* (2006.01)
*B01J 20/08* (2006.01)
*C01F 7/02* (2022.01)

(52) U.S. Cl.
CPC .............. *B01J 20/08* (2013.01); *B01D 15/00* (2013.01); *B01J 20/28011* (2013.01); *B01J 20/28061* (2013.01); *B01J 20/28083* (2013.01); *C01F 7/02* (2013.01); *C01P 2006/12* (2013.01); *C01P 2006/16* (2013.01); *C01P 2006/32* (2013.01)

(58) Field of Classification Search
CPC ..... B01D 15/00; B01J 20/08; B01J 20/28011; B01J 20/28057; B01J 20/28061; B01J 20/28083; C01F 7/02; C01P 2006/12; C01P 2006/16; C01P 2006/32; Y02C 20/40
See application file for complete search history.

(56) References Cited

U.S. PATENT DOCUMENTS

| | | | | |
|---|---|---|---|---|
| 4,824,576 | A | 4/1989 | Sood et al. | |
| 5,171,559 | A | 12/1992 | Ando | |
| 5,954,944 | A * | 9/1999 | Zhang .................... | C10G 45/08 208/89 |
| 2017/0008821 | A1 | 1/2017 | Hossain et al. | |
| 2017/0080400 | A1* | 3/2017 | Reddy ................ | B01J 20/28069 |
| 2017/0362465 | A1 | 12/2017 | Ashitaka et al. | |
| 2019/0201875 | A1* | 7/2019 | Hori ................... | B01D 53/9418 |
| 2021/0139342 | A1 | 5/2021 | Tsubota et al. | |

FOREIGN PATENT DOCUMENTS

| | | | |
|---|---|---|---|
| CN | 102491388 | A | 6/2012 |
| CN | 103611491 | A | 3/2014 |
| CN | 107207268 | A | 9/2017 |
| CN | 108654554 | A | 10/2018 |
| CN | 110385111 | A | 10/2019 |
| CN | 111330534 | A | 6/2020 |
| JP | S63-273093 | A | 11/1988 |
| JP | 04-078438 | A | 3/1992 |
| JP | 2005-015323 | A | 1/2005 |
| JP | 2005-046663 | A | 2/2005 |
| JP | 2019-000764 | A | 1/2019 |
| WO | WO-2017/126602 | A1 | 7/2017 |

OTHER PUBLICATIONS

Kim et al., “Arsenic Removal Using Mesoporous Alumina Prepared via a Templating Method”, Env. Science and Tech. vol. 38, issue 3 (2003) (Year: 2003).*

Zhao et al., “Mesoporous alumina molecular sieves: characterization and catalytic activity in hydrolysis of carbon disulfide”, Catalysis Letters, vol. 89, (2003) (Year: 2003).*

Extended European Search Report Issued in corresponding EP Appl. Ser. No. 21853607.6 Dated Oct. 16, 2024 (5 pages).

Meunier G. et al: “Adsorption of vanadate on [gamma]-alumina: Comparison with other isopolyanions”, Applied Catalysis, vol. 21, No. 2, Mar. 1, 1986 (Mar. 1, 1986), pp. 329-335 (7 pages).

Rahmati Mahmood et al: “Effect of different alumina supports on performance of cobalt Fischer-Tropsch catalysts”, Journal of Catalysis, Academic Press, Duluth, MN, US, vol. 359, Feb. 3, 2018 (Feb. 3, 2018), pp. 92-100 (9 pages).

English Translation of International Preliminary Report on Patentability and Written Opinion issued in International Patent Application No. PCT/JP2021/029172 dated Feb. 16, 2023 (5 pages).

(Continued)

*Primary Examiner* — Dirk R Bass
(74) *Attorney, Agent, or Firm* — Foley & Lardner LLP

(57) ABSTRACT

Provided is an absorption method of an element belonging to periods 4 to 6 and groups 3 to 15 of the periodic table. The method includes: preparing mesoporous alumina that satisfies at least one of the following items:

(1) a surface hydroxyl content is 3.5 mmol/g or more;
(2) a low-temperature $CO_2$ desorption amount in $CO_2$ thermal desorption amount spectrometry is 5 μmol/g or more; and
(3) a low-temperature $NH_3$ desorption amount in $NH_3$ thermal desorption amount spectrometry is 25 μmol/g or more; and bringing a liquid containing an absorption target element in contact with the mesoporous alumina to absorb the absorption target element in the mesoporous alumina. The absorption target element is at least one type selected from the group consisting of an element belonging to periods 4 to 6 and groups 3 to 15 of the periodic table.

5 Claims, No Drawings

(56) References Cited

OTHER PUBLICATIONS

CN Office Action issued in corresponding CN Application No. 202180057827.4 Dated Jun. 26, 2025 (13 pages).
SG Office Action issued in corresponding SG Application No. 11202300667W Dated Aug. 18, 2025 (11 pages).
Japanese Office Action corresponding to JP Patent Appl. No. 2022-541736 dated Sep. 25, 2025.
Substantive Examination Adverse Report on Malaysian Appl. No. PI2023000501, dated Jan. 21, 2026 (3 pages).
Notification of Grant of Invention Patent on CN Appl. No. 202180057827.4 dated Feb. 12, 2026 (10 Pages).
Wang F et al., "Study on the Effect on Catalytic Activity of y-Al2O3 Supported Nano-sized SO42-/TiO2 Solid Super Acid," Journal of Hebei Institute of Architecture and Civil Engineering, issue 4 (2017).
Japanese Office Action corresponding to JP Appl. No. 2022-541736 dated Mar. 12, 2026 (4 pages).
Korean Office Action corresponding to KR Appl. No. 10-2023-7007237 dated Apr. 1, 2026 (14 pages).

* cited by examiner

ABSORPTION METHOD AND MESOPOROUS ALUMINA USED FOR THE SAME

The application claims the priority based on U.S. provisional Application No. 63/061,956 filed on Aug. 6, 2020, the content of which is herein incorporated by reference in its entirety.

TECHNICAL FIELD

The present invention relates to an absorption method and mesoporous alumina used for the same.

BACKGROUND ART

Porous metallic oxide is known to be used as an absorption material, a catalytic carrier, etc. For example, Patent Document 1 relates to a technology of absorbing and removing radioactive cesium and strontium from natural water or contaminated water, and have proposed a cesium/strontium absorption material made of phase-separated porous glass and a system that forms a stable vitrified waste after absorption. Patent Document 2 describes porous metallic oxide useful as a molybdenum (Mo) absorption material of a $^{99m}$Tc generator and the like, and a method for producing the same.

CITATION LIST

Patent Literature

[Patent Document 1] Japanese Patent Application Publication No. 2019-000764
[Patent Document 2] WO2017/126602

SUMMARY OF INVENTION

Technical Problem

The technology described in Patent Document 1 is based on use of phase-separated porous glass mostly composed of $SiO_2$ (see, e.g., claim 1 and paragraph [0051]), and does not employ an absorption material primarily composed of alumina. Patent Document 1 also limits elements to be absorbed in an absorption material (absorption target elements) to cesium and strontium, and is not intended for absorption of any other element. Patent Document 2 relates to Mo retention amounts of porous alumina and other metallic oxides, and has focused on a production method, structural characteristics (e.g., specific surface area, pore volume, and mean pore size), and the like of the porous metallic oxide, but has not specifically investigated for retaining an element other than Mo. It is beneficial to provide an absorption method using an absorption material, in which the absorption method is also applicable for absorption of an element in groups 3 to 15 of the periodic table other than Mo.

An object of the present invention is to provide an absorption method to solve such problems. Another object related thereto is to provide an absorption material suitable for conducting the absorption method.

Solution to Problem

The specification provides an absorption method of an element belonging to periods 4 to 6 and groups 3 to 15 of the periodic table. The absorption method includes preparing mesoporous alumina, bringing a liquid containing an absorption target element in contact with the mesoporous alumina to absorb the absorption target element in the mesoporous alumina. The absorption target element is at least one type selected from the group consisting of elements belonging to periods 4 to 6 and groups 3 to 15 of the periodic table. A material to be used as the mesoporous alumina satisfies at least of the following items (1) to (3):

(1) a surface hydroxyl content is 3.5 mmol/g or more;

(2) a $CO_2$ amount desorbed at a peak with a peak temperature of less than 200° C. in thermal desorption amount spectrometry using $CO_2$ as a probe molecule (hereinafter also referred to as "low-temperature $CO_2$ desorption amount") is 5 μmol/g or more; and (3) a $NH_3$ content desorbed at a peak with a peak temperature of less than 300° C. in thermal desorption amount spectrometry using $NH_3$ as a probe molecule (hereinafter also referred to as "low-temperature $NH_3$ desorption amount") is 25 μmol/g or more.

Satisfying one or two or more of the items (1) to (3) is associated with tendency of a larger retention amount (absorption amount) of the absorption target element per unit weight of the mesoporous alumina. Accordingly, the above-described absorption method using such mesoporous alumina allows efficient absorption of the absorption target element.

The specification also provides mesoporous alumina that satisfies at least one of the following items (1) to (3):

(1) a surface hydroxyl content is 3.5 mmol/g or more;

(2) a $CO_2$ amount desorbed at a peak with a peak temperature of less than 200° C. in thermal desorption amount spectrometry using $CO_2$ as a probe molecule is 5 μmol/g or more; and (3) a $NH_3$ content desorbed at a peak with a peak temperature of less than 300° C. in thermal desorption amount spectrometry using $NH_3$ as a probe molecule is 25 μmol/g or more. Such mesoporous alumina is preferable because of its capability to absorb efficiently the absorption target element.

DESCRIPTION OF EMBODIMENTS

Preferable embodiments in the present invention will now be described below. Matters necessary for implementation of the present invention except for matters particularly mentioned herein can be recognized as matters to be designed by those skilled in the art based on conventional technologies in the art. The present invention can be implemented based on contents disclosed herein and common technical knowledge in the art.

The mesoporous alumina in the technology disclosed herein satisfies at least one of a predetermined surface hydroxyl content, a predetermined low-temperature $CO_2$ desorption amount, and a predetermined low-temperature $NH_3$ desorption amount as described below. Among these, two or more may be satisfied or all three may be satisfied by the mesoporous alumina.

In an aspect of the mesoporous alumina satisfying at least a predetermined surface hydroxyl content, the mesoporous alumina may have a surface hydroxyl content of 3.5 mmol/g or more. Mesoporous alumina satisfying such surface hydroxyl content tends to have a larger retention amount of an absorption target element per unit weight compared to mesoporous alumina having a smaller surface hydroxyl content. In some aspects, the surface hydroxyl content is preferably 3.7 mmol/g or more, and may be e.g., 4.0 mmol/g or more, 4.5 mmol/g or more, and 5.0 mmol/g or more. The upper limit of the surface hydroxyl content is not particularly limited as long as it is an amount theoretically possible in relation to a specific surface area of mesoporous alumina. In view of ease of manufacture, handiness, preservability, quality stability, etc., in some aspects, the surface hydroxyl content may be e.g., 20 mmol/g or less, 15 mmol/g or less, 10 mmol/g or less, 8 mmol/g or less, or 6 mmol/g or less.

The surface hydroxyl content referred to herein can be obtained by thermogravimeter-differential thermal analysis (TG-DTA), and is particularly measured by the following method. A similar method is also employed for the examples described later.

[Method for Measuring Surface Hydroxyl Content]

A container containing a sample to be measured and water is left to stand in a desiccator to allow water vapor to be absorbed onto a hydroxyl group on the surface of the sample. After a lapse of sufficient time (preferably three hours or more), the sample is heated from room temperature to 200° C. at a rate of 5° C./min, followed by a duration of 12 hours, and measured for weight reduction caused by desorption of physically-absorbed water from the sample with a thermogravimeter-differential thermal analyzer. The sample is further heated to 900° C. at a rate of 5° C./min, followed by a duration of 12 hours, and measured for an amount of water released by dehydration condensation of two adjoining hydroxyl groups. The results thus obtained is subjected to calculation of a surface hydroxyl content [mmol/g] in accordance with the following formula:

$$\text{surface hydroxyl content [mmol/g]}=1.111\times\Delta W2/(1-\Delta W1/100)$$

In the formula described above, ΔW1 represents a weight reduction rate [wt %] in heating from room temperature to 200° C. followed by a duration at 200° C. In the formula described above, ΔW2 represents a weight reduction rate [wt %] in heating from 200° C. to 900° C. followed by a duration at 900° C.

In an aspect of the mesoporous alumina satisfying at least a predetermined low-temperature $CO_2$ desorption amount, the mesoporous alumina may have a low-temperature $CO_2$ desorption amount of 5 mol/g or more. Mesoporous alumina satisfying such low-temperature $CO_2$ desorption amount tends to have a larger retention amount of an absorption target element per unit weight compared to mesoporous alumina having a smaller low-temperature $CO_2$ desorption amount. In some aspects, the low-temperature $CO_2$ desorption amount is preferably 8 μmol/g or more, and may be 10 μmol/g or more, 12 μmol/g or more, 15 μmol/g or more, or 20 μmol/g or more. The upper limit of the low-temperature $CO_2$ desorption amount is not particularly limited, as long as it is an amount theoretically possible in relation to a specific surface area of mesoporous alumina. In view of ease of manufacture, handiness, preservability, quality stability, etc., in some aspects, the low-temperature $CO_2$ desorption amount may be e.g., 400 μmol/g or less, 300 μmol/g or less, 250 μmol/g or less, 200 μmol/g or less, 100 μmol/g or less, 70 μmol/g or less, 50 μmol/g or less, 30 μmol/g or less, 20 μmol/g or less, and 15 μmol/g or less.

The low-temperature $CO_2$ desorption amount referred to herein can be obtained by thermal desorption amount spectrometry using $CO_2$ as a probe molecule ($CO_2$-TPD), and is particularly measured by the following method. A similar method is also employed for the examples described later.

[Method for Measuring Low-Temperature $CO_2$ Desorption Amount]

A sample to be measured is placed under reduced pressure (1 Pa or less) at 150° C. for 10 hours, and then $CO_2$ gas is passed into a sample tube containing the sample left to stand and kept at 40° C., so as to allow the sample to absorb $CO_2$ sufficiently. Helium (He) gas is then used to purge an excess of $CO_2$ under a reduced pressure of about 3 kPa to about 10 kPa. Subsequently, while temperature is raised at 5° C./min with He circulation under reduced pressure, a concentration of $CO_2$ desorbed at each temperature is measured with a quadrupole mass spectrometer. The TPD desorption curve thus obtained is separated by peak, and a $CO_2$ desorption amount at each peak is calculated based on an area of the peak. Especially, a $CO_2$ desorption amount derived from an area of a peak with a peak temperature of less than 200° C. is defined as a low-temperature $CO_2$ desorption amount of the sample. As the quadrupole mass spectrometer, the model "OmniStar GSD301", manufactured by Pfeiffer Vacuum GmbH (used in the examples described later), or a comparable thereof can be used.

In some aspects of the technologies disclosed herein, the mesoporous alumina may be identified by use of a $CO_2$ desorption amount (hereinafter also referred to as "ambient-pressure, low-temperature $CO_2$ desorption amount") measured by the following method, instead of a low-temperature $CO_2$ desorption amount measured under reduced pressure (hereinafter also referred to as "reduced-pressure, low-temperature $CO_2$ desorption amount") by the aforementioned method, or in addition to the reduced-pressure, low-temperature $CO_2$ desorption amount.

[Method for Measuring Ambient-Pressure, Low-Temperature $CO_2$ Desorption Amount]

A sample to be measured is heated to 500° C. at a rate of 10° C./hr under an ambient pressure of about 1 atm, followed by a duration of 60 minutes, and then $CO_2$ gas is passed into a sample tube containing the sample left to stand and kept at 35° C., so as to allow the sample to absorb $CO_2$ sufficiently. He gas is then used to purge an excess of $CO_2$ under an ambient pressure of about 1 atm. Subsequently, while temperature is raised to 500° C. at a rate of 10° C./hr with He circulation under an ambient pressure of about 1 atm, a concentration of $CO_2$ desorbed at each temperature is measured with a quadrupole mass spectrometer. The TPD desorption curve thus obtained is separated by peak, and a $CO_2$ desorption amount at each peak is calculated based on an area of the peak. Especially, a $CO_2$ desorption amount derived from an area of a peak with a peak temperature of less than 200° C. is defined as an ambient-pressure, low-temperature $CO_2$ desorption amount of the sample. As the quadrupole mass spectrometer, the product named "MKS Cirrus 2", manufactured by MKS Instruments UK Ltd. (used in the examples described later), or a comparable thereof can be used.

An ambient-pressure, low-temperature $CO_2$ desorption amount of the mesoporous alumina may be e.g., 5 μmol/g or more, 10 μmol/g or more, 20 μmol/g or more, and 30 μmol/g or more. Increase in ambient-pressure, low-temperature $CO_2$ desorption amount is associated with tendency of a larger retention amount of absorption target element (e.g., Mo) per unit weight of the mesoporous alumina. In this view, an ambient-pressure, low-temperature $CO_2$ desorption amount of the mesoporous alumina is, in some aspects, suitably 35 μmol/g or more, favorably 45 μmol/g or more, preferably 55 μmol/g or more, and may be 75 μmol/g or more, 95 μmol/g or more, 110 μmol/g or more. 130 μmol/g or more, 140 μmol/g or more, and 150 μmol/g or more. The upper limit of the ambient-pressure, low-temperature $CO_2$ desorption amount is not particularly limited, as long as it is an amount theoretically possible in relation to a specific surface area of mesoporous alumina. In view of ease of manufacture, handiness, preservability, quality stability, etc., in some aspects, the ambient-pressure, low-temperature $CO_2$ desorption amount may be, e.g., 400 μmol/g or less, 300 μmol/g or less. 250 μmol/g or less, 230 μmol/g or less, or 200 μmol/g or less.

In an aspect of the mesoporous alumina satisfying at least a predetermined low-temperature $NH_3$ desorption amount, the mesoporous alumina may have a low-temperature $NH_3$ desorption amount of 25 μmol/g or more. Mesoporous alumina satisfying such low-temperature $NH_3$ desorption amount tends to have a larger retention amount of an absorption target element per unit weight compared to mesoporous alumina having a smaller low-temperature $NH_3$ desorption amount. In some aspects, the low-temperature $NH_3$ desorption amount is preferably 30 μmol/g or more, and may be 40 μmol/g or more, 50 μmol/g or more, 60 μmol/g or more, or 70 μmol/g or more. The upper limit of the low-temperature $NH_3$ desorption amount is not particularly limited, as long as it is an amount theoretically possible in relation to a specific surface area of mesoporous alumina. The low-temperature $NH_3$ desorption amount of the mesoporous alumina may be, e.g., 700 μmol/g or less, 500 μmol/g or less, or 400 μmol/g or less. In view of ease of manufacture, handiness, preservability, quality stability, etc., in some aspects, the low-temperature $NH_3$ desorption amount of mesoporous alumina may be, e.g., 300 μmol/g or less, less than 200 μmol/g, 150 μmol/g or less, 100 μmol/g or less, 80 μmol/g or less, or 60 μmol/g or less.

The low-temperature $NH_3$ desorption amount referred to herein can be obtained by thermal desorption amount spectrometry using $NH_3$ as a probe molecule ($NH_3$-TPD), and is particularly measured by the following method. A similar method is also employed for the examples described later.

[Method for Measuring Low-Temperature $NH_3$ Desorption Amount]

A sample to be measured is placed under a reduced pressure of 1 Pa or less at 150° C. for 10 hours, and then $NH_3$/He mixed gas is passed into a sample tube containing the sample left to stand and kept at 40° C., so as to allow the sample to absorb $NH_3$ sufficiently, followed by switching to He gas to purge an excess of $NH_3$ under a reduced pressure of about 3 kPa to about 10 kPa. Subsequently, while temperature is raised at a rate of 10° C./min with He circulation under reduced pressure, a concentration of $NH_3$ desorbed at each temperature is measured with a quadrupole mass spectrometer. The TPD desorption curve thus obtained is separated by peak, and a $NH_3$ desorption amount at each peak is calculated based on an area of the peak. Especially, a $NH_3$ desorption amount derived from an area of a peak with a peak temperature of less than 300° C. is defined as a low-temperature $NH_3$ desorption amount of the sample. As the quadrupole mass spectrometer, the model "OmniStar GSD301", manufactured by Pfeiffer Vacuum GmbH (used in the examples described later), or a comparable thereof can be used.

In the technologies disclosed herein, a specific surface area of the mesoporous alumina is not particularly limited. The specific surface area may be, e.g., approximately 50 $m^2/g$ or more. In some aspects, in view of providing a larger contact area with an absorption target element, the specific surface area is favorably approximately 100 $m^2/g$ or more, preferably approximately 130 $m^2/g$ or more, more preferably approximately 150 $m^2/g$ or more, and may be approximately 190 $m^2/g$ or more or approximately 220 $m^2/g$ or more. Furthermore, in view of strength and durability of the mesoporous alumina, in some aspects, the specific surface area may be e.g., approximately 500 $m^2/g$ or less, approximately 400 $m^2/g$ or less, approximately 300 $m^2/g$ or less, approximately 270 $m^2/g$ or less, or approximately 220 $m^2/g$ or less. The specific surface area can be measured by a method for measuring an amount of nitrogen gas absorption (BET). A similar method is also employed for the examples described later.

In the technologies disclosed herein, a mean pore size of mesoporous alumina is not particularly limited, but typically in the range of approximately 2 nm to approximately 50 nm. In some aspects, in view of easily providing the aforementioned specific surface area, the mean pore size is suitably approximately 40 nm or less, preferably approximately 30 nm or less, more preferably approximately 25 nm or less, and may be less than approximately 20 nm, less than approximately 15 nm, less than approximately 13 nm, less than approximately 11 nm, and less than approximately 9 nm. Furthermore, in some aspects, in view of a contact efficiency with an absorption target element and the like, the mean pore size is suitably approximately 4 nm or more, preferably approximately 6.5 nm or more, and may be approximately 8 nm or more, approximately 10 nm or more, approximately 13 nm or more, or approximately 16 nm or more. The mean pore size can be measured by a method for measuring an amount of nitrogen gas absorption (BJH). A similar method is also employed for the examples described later.

In the technologies disclosed herein, a pore volume of the mesoporous alumina is not particularly limited. In some aspects, in view of contact efficiency with an absorption target element and the like, the pore volume is suitably approximately 0.2 $cm^3/g$ or more, preferably approximately 0.4 $cm^3/g$ or more, more preferably approximately 0.5 $cm^3/g$ or more, and may be approximately 0.7 $cm^3/g$ or more, or approximately 1.1 $cm^3/g$ or more. Furthermore, in view of strength and durability of the mesoporous alumina, in some aspects, the pore volume may be e.g., approximately 3.0 $cm^3/g$ or less, approximately 2.2 $cm^3/g$ or less, approximately 1.7 $cm^3/g$ or less, approximately 1.2 $cm^3/g$ or less, or approximately 0.8 $cm^3/g$ or less. The pore volume can be measured by a method for measuring an amount of nitrogen gas absorption. A similar method is also employed for the examples described later.

Since the mesoporous alumina in the technologies disclosed herein facilitates increase in a retention amount of an absorption target element per weight, sintering is preferably made so as to generate γ-alumina (sometimes also referred to as activated alumina). Confirmation of the mesoporous alumina as γ-alumina can be obtained by e.g., X-ray diffraction.

A method for producing the mesoporous alumina in the technologies disclosed herein is not particularly limited. One skilled in the art can produce mesoporous alumina that satisfies one, two, or three of a predetermined surface hydroxyl content, a predetermined reduced-pressure, low-temperature $CO_2$ desorption amount (or a predetermined ambient-pressure, low-temperature $CO_2$ desorption amount), and a predetermined low-temperature $NH_3$ desorption amount as disclosed herein, by appropriately performing e.g., selection of a production method, choice of a material to be used, and setting of conditions for production, treatment, and the like, based on one or two or more known techniques, and can prepare mesoporous alumina to be used for any of absorption methods disclosed herein.

Examples of the known technologies described above include, but not limited to, sintering an alumina precursor provided by mixing an aluminum source, a pore former, and an aqueous solvent to prepare a slurry that is then dried; sintering alumina sol, alumina hydrate, or the like; removing a surfactant by sintering, washing, or the like from an alumina precursor provided by a sol-gel method that uses surfactant micelle as a template for pore formation; and producing a material with a vapor-induced self-organization method. The sintering is preferably performed so as to generate γ-alumina. For example, sintering temperature to be employed may be preferably approximately 500° C. or more and approximately 800° C. or less (more preferably, approximately 550° C. or more and approximately 700° C. or less, or approximately 650° C. or more and 750° C. or less).

As the aluminum source, an organoaluminum compound or a hydrolysate thereof can be used. As the organoaluminum compound, aluminum alkoxide such as aluminum isopropoxide can be used. Examples of the pore former or template include, but not limited to, inorganic compounds that degrades to generate gas by heating at a sintering temperature or less (preferably a compound belonging to at least one of an ammonium salt, a carbonate salt and a bicarbonate salt, such as ammonium carbonate, ammonium bicarbonate, and sodium bicarbonate), organic compounds capable of degrading to be removed by heating (e.g., a polymer of glucose or the like, and polymer nanosphere such as polydiaminopyridine nanosphere). Usage of the pore former (e.g., the inorganic compound) to 100 parts by weight of the aluminum source (e.g., aluminum alkoxide) can be e.g., 50 parts or more by weight, and preferably 100 parts or more by weight.

The absorption method disclosed herein includes preparing mesoporous alumina that satisfies one, two, or three of a predetermined surface hydroxyl content, a predetermined reduced-pressure, low-temperature $CO_2$ desorption amount (or a predetermined ambient-pressure, low-temperature $CO_2$ desorption amount), and a predetermined low-temperature $NH_3$ desorption amount described above, and bringing an absorption target element-containing liquid in contact with the mesoporous alumina. The absorption method can be preferably performed with the mesoporous alumina as disclosed herein. Contact of an absorption target element-containing liquid with the mesoporous alumina allows an absorption target element contained in the absorption target element-containing liquid to be absorbed in the mesoporous alumina. Of note, absorption of an absorption target element in the mesoporous alumina can also be recognized as removal or separation of the absorption target element with use of the mesoporous alumina. Accordingly, matters disclosed hereby encompass technologies for absorbing, separating, or removing an absorption target element with use of the mesoporous alumina.

The absorption target element is at least one type selected from the group consisting of elements belonging to periods 4 to 6 and groups 3 to 15 of the periodic table. In some aspects, the absorption target element may be an element belonging to periods 4 to 6 (e.g., periods 4 to 5) and groups 4 to 15, an element belonging to periods 4 to 6 (e.g., periods 4 to 5) and groups 3 to 14, an element belonging to periods 4 to 6 (e.g., periods 4 to 5) and groups 4 to 14, or an element belonging to periods 4 to 6 (e.g., periods 4 to 5) and groups 4 to 12 of the periodic table. Furthermore, in some aspects, the absorption target element may be an element belonging to period 4 and groups 3 to 15 (preferably groups 4 to 14, such as groups 4 to 12), or an element belonging to period 5 and groups 3 to 15 (preferably groups 4 to 14, such as groups 4 to 12) of periodic table. Particular examples of possible elements to be absorption targets in the absorption method disclosed herein include, but not limited to, Ti, Cr, Co, Ni, Cu, Zn, Zr, Mo, and Pb.

A content of an absorption target element in an absorption target element-containing liquid is not particularly limited. In some aspects, a content of an absorption target element may be e.g., more than 0 g/L and 20 g/L or less. The mesoporous alumina disclosed herein may also be preferably used for an application to absorb an absorption target element from an absorption target element-containing liquid where a content of the absorption target element is e.g., 20000 ppm or less, 10000 ppm or less, or 5000 ppm or less. A content of an absorption target element may be, e.g., 1 ppm or more, 10 ppm or more, or 100 ppm or more.

Without particular limitation, pH of an absorption target element-containing liquid may be e.g., about 2 to 12, 2 to 10, or 2 to 8. The technologies disclosed herein can be preferably applied to an absorption target element-containing liquid having e.g., a pH of 2 to 6. In view of durability of mesoporous alumina, pH of an absorption target element-containing liquid is favorably approximately 2.5 or more. In some aspects, pH may be 3 or more, 4 or more, or 4.5 or more. In some other aspects, pH may be 5.5 or less, 4 or less, and 3 or less. In order to adjust pH of an absorption target element-containing liquid, a suitable amount of a pH adjuster can be used as required. Examples of the pH adjuster to be used can include, but not limited to, potassium hydroxide, sodium hydroxide, hydrochloric acid, nitric acid, and sulfuric acid. The pH adjuster can be used singly or in appropriate combination of two or more kinds thereof.

A temperature of an absorption target element-containing liquid to contact mesoporous alumina is not particularly limited, and may be, e.g., about 0° C. to 60° C. In some preferred aspects, a temperature of an absorption target element-containing liquid may be 10° C. or more, 20° C. or more, also 50° C. or less, or 40° C. or less. In view of ease of operation and the like, an aspect of contact at room temperature (typically 20° C. to 30° C.) may be preferably employed.

An aspect of bringing an absorption target element-containing liquid in contact with mesoporous alumina is not particularly limited, and the contact can be made by e.g., passage of liquid and immersion. Passage of liquid may be run in a single pass, and may be made by circulating an absorption target element-containing liquid.

Any one of the mesoporous alumina disclosed herein is preferably used not only for absorption of an absorption target element but also for various applications in a variety of fields. Exemplary applications of any one of the mesoporous alumina disclosed herein include, but not limited to, metal ion absorbing materials, metal ion separating materials, liquid absorbing materials, liquid filtering materials, liquid separating materials, gas absorbing materials, gas filtering materials, gas separating materials, water absorption materials, water retaining materials, humidity control materials, wastewater treatment materials, aromatic or deodorant carriers, food purification or disinfectant materials, materials for separating or concentrating pharmaceutical microbial bodies or other microbial bodies, drug delivery carriers, cosmetic materials, catalytic carriers, materials for a bioreactor or supported microbes, humidity sensor materials, sound absorption or attenuation materials, heat insulating materials, and heat blocking materials. Matters disclosed herein can encompass use of the mesoporous alumina for any of the applications described above, and the mesoporous alumina used for such applications.

The matters disclosed hereby includes the following.

[1] A method for absorbing an element belonging to periods 4 to 6 and groups 3 to 15 of the periodic table, the method comprising:

preparing mesoporous alumina that satisfies at least one of the following items (1) to (3):

(1) a surface hydroxyl content measured by the method described below is 3.5 mmol/g or more;

(2) a reduced-pressure, low-temperature $CO_2$ desorption amount measured by the method described below is 5 μmol/g or more; and (3) a low-temperature $NH_3$ desorption amount measured by the method described below is 25 μmol/g or more;

bringing a liquid containing an absorption target element in contact with the mesoporous alumina to absorb the absorption target element in the mesoporous alumina;

wherein the absorption target element is at least one type selected from the group consisting of elements belonging to periods 4 to 6 and groups 3 to 15 of the periodic table.

[Method for Measuring Surface Hydroxyl Content]

A container containing a sample to be measured and water is left to stand in a desiccator to allow water vapor to be absorbed onto a hydroxyl group on the surface of the sample. After a lapse of sufficient time (preferably three hours or more), the sample is heated from room temperature to 200° C. at a rate of 5° C./min, followed by a duration of 12 hours, and measured for weight reduction caused by desorption of physically-absorbed water from the sample with a thermogravimeter-differential thermal analyzer. The sample is further heated to 900° C. at a rate of 5° C./min, followed by a duration of 12 hours, and measured for an amount of water released by dehydration condensation of two adjoining hydroxyl groups. The results thus obtained is subjected to calculation of a surface hydroxyl content [mmol/g] in accordance with the following formula:

$$\text{surface hydroxyl content [mmol/g]}=1.111\times\Delta W2/(1-\Delta W1/100)$$

[Method for Measuring Reduced-Pressure, Low-Temperature $CO_2$ Desorption Amount]

A sample to be measured is placed under reduced pressure (1 Pa or less) at 150° C. for 10 hours, and then $CO_2$ gas is passed into a sample tube containing the sample left to stand and kept at 40° C., so as to allow the sample to absorb $CO_2$ sufficiently. He gas is then used to purge an excess of $CO_2$ under a reduced pressure of about 3 kPa to about 10 kPa. Subsequently, while temperature is raised at 5° C./min with He circulation under reduced pressure, a concentration of $CO_2$ desorbed at each temperature is measured with a quadrupole mass spectrometer. The TPD desorption curve thus obtained is separated by peak, and a $CO_2$ desorption amount at each peak is calculated based on an area of the peak. Especially, a $CO_2$ desorption amount derived from an area of a peak with a peak temperature of less than 200° C. is defined as a reduced-pressure, low-temperature $CO_2$ desorption amount of the sample.

[Method for Measuring Low-Temperature $NH_3$ Desorption Amount]

A sample to be measured is placed under a reduced pressure of 1 Pa or less at 150° C. for 10 hours, and then $NH_3$/He mixed gas is passed into a sample tube containing the sample left to stand and kept at 40° C., so as to allow the sample to absorb $NH_3$ sufficiently, followed by switching to He gas to purge an excess of $NH_3$ under a reduced pressure of about 3 kPa to about 10 kPa. Subsequently, while temperature is raised at a rate of 10° C./min with He circulation under reduced pressure, a concentration of $NH_3$ desorbed at each temperature is measured with a quadrupole mass spectrometer. The TPD desorption curve thus obtained is separated by peak, and a $NH_3$ desorption amount at each peak is calculated based on an area of the peak. Especially, a $NH_3$ desorption amount derived from an area of a peak with a peak temperature of less than 300° C. is defined as a low-temperature $NH_3$ desorption amount of the sample.

[2] A method set forth in the item [1], wherein mesoporous alumina that satisfies at least the item (2) is prepared as the mesoporous alumina.

[3] A method set forth in the item [1], wherein mesoporous alumina that satisfies at least the aforementioned item (2) and the following item (4) is prepared as the mesoporous alumina:

(4) an ambient-pressure, low-temperature $CO_2$ desorption amount measured by the method described below is 5 μmol/g or more (e.g., 35 μmol/g or more).

[Method for Measuring Ambient-Pressure, Low-Temperature $CO_2$ Desorption Amount]

A sample to be measured is heated to 500° C. at a rate of 10° C./hr under an ambient pressure of about 1 atm, followed by a duration of 60 minutes, and then $CO_2$ gas is passed into a sample tube containing the sample left to stand and kept at 35° C., so as to allow the sample to absorb $CO_2$ sufficiently. He gas is then used to purge an excess of $CO_2$ under an ambient pressure of about 1 atm. Subsequently, while temperature is raised to 500° C. at a rate of 10° C./hr with He circulation under an ambient pressure of about 1 atm, a concentration of $CO_2$ desorbed at each temperature is measured with a quadrupole mass spectrometer. The TPD desorption curve thus obtained is separated by peak, and a $CO_2$ desorption amount at each peak is calculated based on an area of the peak. Especially, a $CO_2$ desorption amount derived from an area of a peak with a peak temperature of less than 200° C. is defined as an ambient-pressure, low-temperature $CO_2$ desorption amount of the sample.

[4] A method for absorbing an element belonging to periods 4 to 6 and groups 3 to 15 of the periodic table, the method comprising:

preparing mesoporous alumina that satisfies at least one of the following items (1), (3), and (4):

(1) a surface hydroxyl content measured by the method set forth in the item [1] is 3.5 mmol/g or more;

(3) a low-temperature $NH_3$ desorption amount measured by the method set forth in the item [1] is 25 μmol/g or more; and (4) an ambient-pressure, low-temperature $CO_2$ desorption amount measured by the method described below is 5 μmol/g or more (e.g., 35 μmol/g or more); and bringing a liquid containing an absorption target element in contact with the mesoporous alumina to absorb the absorption target element in the mesoporous alumina;

wherein the absorption target element is at least one type selected from the group consisting of elements belonging to periods 4 to 6 and groups 3 to 15 of the periodic table.

[Method for Measuring Ambient-Pressure, Low-Temperature $CO_2$ Desorption Amount]

A sample to be measured is heated to 500° C. at a rate of 10° C./hr under an ambient pressure of about 1 atm, followed by a duration of 60 minutes, and then $CO_2$ gas is passed into a sample tube containing the sample left to stand and kept at 35° C., so as to allow the sample to absorb $CO_2$ sufficiently. He gas is then used to purge an excess of $CO_2$ under an ambient pressure of about 1 atm. Subsequently, while temperature is raised to 500° C. at a rate of 10° C./hr with He circulation under an ambient pressure of about 1 atm, a concentration of $CO_2$ desorbed at each temperature is measured with a quadrupole mass spectrometer. The TPD desorption curve thus obtained is separated by peak, and a $CO_2$ desorption amount at each peak is calculated based on an area of the peak. Especially, a $CO_2$ desorption amount derived from an area of a peak with a peak temperature of less than 200° C. is defined as an ambient-pressure, low-temperature $CO_2$ desorption amount of the sample.

[5] the Method Set Forth in the Item [4], Wherein Mesoporous Alumina that Satisfies at Least the item (4) is prepared as the mesoporous alumina.

[6] The method set forth in any one of the items [1] to [5], wherein the mesoporous alumina has a specific surface area of 100 $m^2$/g or more.

[7] The method set forth in any one of the items [1] to [6], wherein the mesoporous alumina has a mean pore size of 2 nm or more to 30 nm or less.

[8] The method set forth in any one of the items [1] to [7], wherein a liquid containing the absorption target element has a pH of 2 to 6.

[9] Mesoporous alumina used in the method set forth in any one of the items [1] to [8].

[10] Mesoporous alumina used for absorbing an element belonging to periods 4 to 6 and groups 3 to 15 of the periodic table, the mesoporous alumina satisfying at least one of the following items (1) to (3):

(1) a surface hydroxyl content measured by the method set forth in the item [1] is 3.5 mmol/g or more;

(2) a reduced-pressure, low-temperature $CO_2$ desorption amount measured by the method set forth in the item [1] is 5 μmol/g or more; and (3) a low-temperature $NH_3$ desorption amount measured by the method set forth in the item [1] is 25 μmol/g or more.

[11] The mesoporous alumina set forth in the item [10], satisfying at least the item (2).

[12] The mesoporous alumina set forth in the item [11], satisfying at least the aforementioned item (2) and the following item (4):

(4) an ambient-pressure, low-temperature $CO_2$ desorption amount measured by the method set forth in the item [4] is 5 μmol/g or more (e.g., 35 μmol/g or more).

[13] Mesoporous alumina used for absorbing an element belonging to periods 4 to 6 and groups 3 to 15 of the periodic table, the mesoporous alumina satisfying at least one of the following items (1), (3), and (4):

(1) a surface hydroxyl content measured by the method set forth in the item [1] is 3.5 mmol/g or more;

(3) a low-temperature $NH_3$ desorption amount measured by the method set forth in the item [1] is 25 μmol/g or more; and (4) an ambient-pressure, low-temperature $CO_2$ desorption amount measured by the method set forth in the item [4] is 5 μmol/g or more (e.g., 35 μmol/g or more).

[14] The mesoporous alumina set forth in the item [13], satisfying at least the item (4).

[15] The mesoporous alumina set forth in any one of the items [10] to [14], wherein the mesoporous alumina has a specific surface area of 100 $m^2$/g or more.

[16] The mesoporous alumina set forth in any one of the items [10] to [15], wherein the mesoporous alumina has a mean pore size of 2 nm or more to 30 nm or less.

EXAMPLES

Several examples relating to the present invention will be described below, but the present invention is not intended to be limited to matters shown in such particular examples.

Example 1

<Preparation of Mesoporous Alumina>

Preparation Example 1

At room temperature, in a container containing 970 g of distilled water with stirring, 60 g of ammonium carbonate was charged and dissolved, followed by charging of 32 g of powdered aluminum isopropoxide, and subject to continuous stirring for 24 hours at room temperature to prepare an intermediate liquid. The intermediate liquid was transferred to a heatproof container, and dried at 80° C. for 48 hours to provide powdered alumina precursor. The powder was sintered in a sintering furnace at 700° C. under the air atmosphere for 5 hours, then crushed and passed through a 50 mesh metal gauze. In this manner, the mesoporous alumina of Sample 1 (specific surface area: 219 $m^2$/g, pore volume: 1.63 $cm^3$/g, mean pore size: 11.1 nm) was prepared.

Preparation Example 2

The mesoporous alumina of Sample 2 (specific surface area: 224 $m^2$/g, pore volume: 0.61 $cm^3$/g, mean pore size: 9.6 nm) was prepared in the same manner as in the preparation of the mesoporous alumina of Sample 1 except for changing the usage of ammonium carbonate to 30 g.

Preparation Example 3

A commercially available alumina sol (manufactured by Nissan Chemical Corporation, AS-200) was sintered in a sintering furnace at 700° C. under the air atmosphere for 5 hours, then crushed and passed through a 50 mesh metal gauze. In this manner, the mesoporous alumina of Sample 3 (specific surface area: 204 $m^2$/g, pore volume: 0.49 $cm^3$/g, mean pore size: 8.3 nm) was prepared.

As Sample 4, a commercially available mesoporous alumina (Sigma-Aldrich Co. LLC, product number: 199966, activated activity according to Brockmann: I, specific surface area: 154 $m^2/g$, pore volume: 0.25 $cm^3/g$, mean pore size: 6 nm) was used.

<Measurement of Surface Hydroxyl Content, Reduced-Pressure, Low-Temperature $CO_2$ Desorption Amount, and Low-Temperature $NH_3$ Desorption Amount>

Surface hydroxyl contents ($S_{OH}$), reduced-pressure, low-temperature $CO_2$ desorption amounts ($L_{CO2}$), and low-temperature $NH_3$ desorption amounts ($L_{NH3}$) of Samples 1 to 4 were each measured in accordance with the methods described above. The results are shown in Table 1.

<Absorption Test (Operation of Absorption Method)>

The mesoporous alumina of Samples 1 to 4 were filled in a column with a diameter of 4.6 mm and a length of 50 mm. At room temperature, a liquid containing Mo as an absorption target element was passed through the column at a rate of 5 mL/min using a pump. Mo retention amount (mg/g) was calculated by determining Mo concentrations of the liquid before and after passing the column by inductively coupled plasma-optical emission spectrometry (ICP-OES), and converting an amount of Mo reduction in post-passage relative to pre-passage to a numerical value per gram of the sample. As the liquid passed through the column, a 0.25 wt % aqueous sodium molybdate solution was adjusted to pH 2.5 with nitric acid (Mo concentration: 900 ppm) for use. The results are shown in Table 1.

TABLE 1

| Sample | $S_{OH}$ [mmol/g] | $L_{CO2}$ [μmol/g] | $L_{NH3}$ [μmol/g] | Mo retention amount [mg/g $Al_2O_3$] |
|---|---|---|---|---|
| 1 | 3.81 | 13.3 | 71.5 | 119 |
| 2 | 4.69 | 22.8 | 67.1 | 61 |
| 3 | 5.18 | 13.4 | 54.4 | 81 |
| 4 | 3.21 | 0 | 19.7 | 45 |

In addition, the samples thus obtained was measured for ambient-pressure, low-temperature $CO_2$ desorption amount in the method described above, thus providing 167.0 μmol/g in Sample 1 and 146.6 μmol/g in Sample 3. Sample 4 exhibited much less ambient-pressure, low-temperature $CO_2$ desorption amount compared to those of Samples 1 and 3. These measurement results and the Mo retention amount of each sample shown in Table 1 revealed a positive correlation between ambient-pressure, low-temperature $CO_2$ desorption amounts and Mo retention amounts. In the absorption test described above, change of pH of the liquid passed through the column to 2.0 also displayed a similar correlation between ambient-pressure, low-temperature $CO_2$ desorption amounts and Mo retention amounts.

Example 2

With use of each of Zr, Co, Cr, Cu, Ni, and Zu as an absorption target element, the same absorption test was performed for Samples 1, 3, and 4 used for the absorption test in Example 1, and a retention amount was derived for each of the metal elements. As an absorption target element-containing liquid passed through the column, an ICP standard liquid (Merck KGaA) containing each element at a concentration of about 1000 ppm was adjusted to pH 2.5 or 5 with KOH for use. The results are shown in Table 2. N/A in Table 2 indicates unperformed.

TABLE 2

| | Metal retention amount [mg/g $Al_2O_3$] | | | | | | | | | | | |
|---|---|---|---|---|---|---|---|---|---|---|---|---|
| | Zr | | Co | | Cr | | Cu | | Ni | | Zn | |
| Sample | pH 2.5 | pH 5 | pH 2.5 | pH 5 | pH 2.5 | pH 5 | pH 2.5 | pH 5 | pH 2.5 | pH 5 | pH 2.5 | pH 5 |
| 1 | N/A | 15 | N/A | 11 | 4 | 9 | 4 | 14 | N/A | 12 | N/A | 11 |
| 3 | 50 | 9 | 1 | 6 | 4 | 7 | 4 | 7 | 2 | 6 | 4 | 8 |
| 4 | 20 | 5 | 0.1 | 1 | 0.7 | 1 | 1 | 4 | 0.2 | 1 | 0.3 | 2 |

Although specific embodiments of the present invention have been described in detail so far, these are merely for illustrations and do not limit the scope of the claims. The techniques recited in the claims include various modifications and alternations of the specific examples exemplified above.

The invention claimed is:

1. A method for absorbing an element belonging to periods 4 to 6 and groups 3 to 14 of the periodic table, the method comprising:

preparing mesoporous alumina satisfying both of the following items (1) and (2):

(1) a $CO_2$ amount desorbed at a peak with a peak temperature of less than 200° C. in thermal desorption amount spectrometry using $CO_2$ as a probe molecule is 5 μmol/g or more; and (2) a $NH_3$ content desorbed at a peak with a peak temperature of less than 300° C. in thermal desorption amount spectrometry using $NH_3$ as a probe molecule is 25 μmol/g or more and less than 300 μmol/g; and bringing a liquid comprising an absorption target element in contact with the mesoporous alumina to absorb the absorption target element in the mesoporous alumina;

wherein the absorption target element is at least one type selected from the group consisting of elements belonging to periods 4 to 6 and groups 3 to 14 of the periodic table.

2. The method according to claim 1, wherein the mesoporous alumina has a specific surface area of 100 $m^2/g$ or more.

3. The method according to claim 1, wherein the mesoporous alumina has a mean pore size of 2 nm or more to 30 nm or less.

4. The method according to claim 1, wherein the liquid comprising the absorption target element has a pH of 2 to 6.

5. The method according to claim 1, wherein the mesoporous alumina has a surface hydroxyl content of 3.5 mmol/g or more.

* * * * *